Jan. 24, 1961      E. C. GEIGER      2,969,186
MISTING CONTROL
Filed April 21, 1960
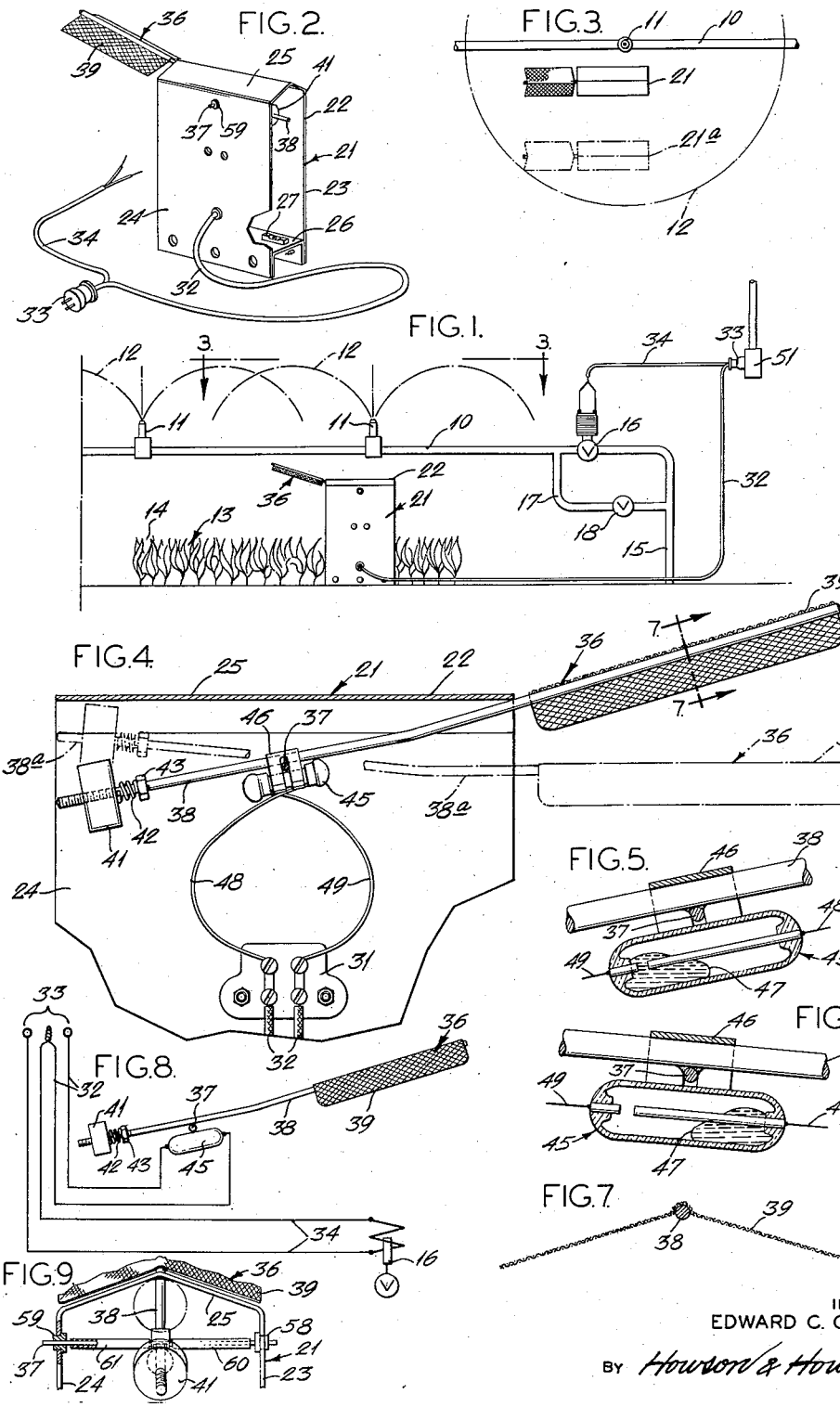
INVENTOR:
EDWARD C. GEIGER
BY Howson & Howson
ATTYS.

United States Patent Office 2,969,186
Patented Jan. 24, 1961

2,969,186

MISTING CONTROL

Edward C. Geiger, North Wales, Pa.

Filed Apr. 21, 1960, Ser. No. 23,678

5 Claims. (Cl. 239—65)

The present invention relates to misting systems for cutting beds and the like, and more particularly to automatic misting systems responsive to the atmospheric conditions surrounding the beds. The present application is a continuation-in-part of my copending application, Serial No. 759,738, filed September 8, 1958.

For efficient and effective plant growth, it is necessary to maintain the cutting bed moist, and prior to the present invention this has been accomplished by periodically spraying the bed with a fine mist. Automatic systems have been provided which include a timer controlling the misting system, but none of the prior art systems is entirely satisfactory. For efficient and effective operation, it is necessary to properly control the cycle or timing interval of the misting operation. Too much water around the plants promotes disease and wastes water whereas too little water causes the leaves of the plant to wilt and retard rooting. The amount of water necessary is dependent not only upon the amount of sunlight or length of day, but also upon the humidity of the surrounding atmosphere. In timed misting systems, it is possible to compensate for changes in the season and length of day, but it is difficult, if not impossible, to compensate for changes in humidity of the surrounding atmosphere which may occur instantaneously.

In my copending application Serial No. 759,738, I have disclosed a misting control of the general type noted above in which electrically conductive collecting electrodes are mounted to collect the mist emanating from the misting nozzles of the system. When the collection is sufficient to complete the circuit including the collecting electrodes, the misting operation is interrupted until such time as the water on the collecting electrodes evaporates to an extent interrupting the electrical circuit. Thus the misting period of the system is controlled in accordance with the humidity of the air surrounding the cutting bed since in more humid weather, a longer period is required to evaporate the water on the collectors whereas in dryer weather the misting recurs more rapidly due to the rapid evaporation of misture from the collectors. This system is not entirely satisfactory in areas where the normal water supply or other liquid being sprayed is not sufficiently conductive to complete the electric circuit and where it may be dangerous to have even low voltage electrodes exposed.

With the foregoing in mind, a primary object of the present invention is to provide an improved misting system responsive to the condition of the atmosphere surrounding the cutting bed and which is devoid of timers and other expensive control devices, but is fully effective in operation and use.

The present invention provides an improved misting control of the stated type which is operative regardless of the conductivity of the water or other liquid being sprayed.

The present invention also provides an electrically controlled system of the stated type wherein the electrical elements are fully protected against damage.

More specifically the present invention provides a systime wherein the weight of the liquid accumulated on a collecting-and-sensing element actuates a circuit controlling the spray of the system, and in which the components intercooperate in a novel manner.

All of the objects of the present invention are more fully set forth hereinafter with reference to the accompanying drawing wherein;

Fig. 1 is a fragmentary view in side elevation of a misting system in accordance with the present invention;

Fig. 2 is a detached perspective view of the sensing and control unit of the system removed from the hydraulic components of the system;

Fig. 3 is a plan view as seen on the line 3—3 of Fig. 1 showing the positioning of the sensing and control unit relative to the spray nozzles;

Fig. 4 is an enlarged fragmentary transverse sectional view through the unit shown in Fig. 2;

Figs. 5 and 6 are further enlarged sectional views showing a detail of the control circuit;

Fig. 7 is a sectional view taken on line 7—7 of Fig. 4;

Fig. 8 is a schematic view showing the electrical circuit of the system shown in Fig. 1; and Fig. 9 is a fragmentary end elevation as seen from the left in Fig. 4.

Referring to the drawings, the misting system comprises a spray pipe 10 having a plurality of misting nozzles 11 connected thereto and operable to direct an umbrella of mist as indicated at 12 over a cutting bed 13. The spray pipe 10 is mounted level at a sufficient distance above the foliage of the cuttings 14 to preclude interference of the pipe 10 with the cuttings. The spray pipe 10 is connected to a liquid supply pipe 15 by a solenoid valve 16 and a bypass 17 having a manually controlled valve 18 therein. The valve 18 is normally closed and is opened only when it is desired to manually control the misting due to failure of the electric supply, or for other purposes.

In accordance with the invention, the operation of the solenoid 16 is controlled automatically in accordance with the requirements of the cutting bed as determined by the prevailing atmospheric conditions. To this end a sensing and control unit 21 is mounted in the bed 13 in the path of the umbrella of mist 12 supplied by one of the misting nozzles 11. The unit 21 comprises a housing 22 having opposed side walls 23 and 24 respectively, a peaked roof 25 and a raised floor 26. The floor 26 mounts a spirit level 27 to insure proper positioning of the unit 21 in the seed bed 13. The side wall 24 mounts a terminal block 31 to which is attached a two-wire cord 32 connected to a plug 33 and a second two-wire cord 34 which is connected to the solenoid valve 16 as shown in Figs. 1 and 8. One wire of the cord 32 is connected to one of the prongs of the plug 33 and the other wire is connected to one of the wires of the cord 34, the other wire of the cord 34 being connected to the other prong of the plug 33.

A moisture collecting-and-sensing element 36 is pivotally mounted on an axle 37 journalled in bushings 58 and 59 in the side walls 23 and 24. Extending perpendicularly to the axle 37 is balance rod 38 mounting at one end a screen element 39. The screen element is nonabsorbent and may be on the order of a 50 mesh to collect water due to the surface tension of the liquid which forms a thin film over the screen. As shown in Figs. 4 and 7, the screen element has a pair of flat faces which decline outwardly from the balance rod 38 so that they shed any accumulation of water which might otherwise affect the control. In this manner only a thin film of water is collected by the collector 39.

At the opposite end of the balance rod 38 a counter weight 41 is threadably engaged on the rod 38 and is locked in position by a friction spring 42 and lock nut 43.

The counter weight 41 is adjusted on the rod so that when the screen or collector 39 is dry the balance 38 is in the position shown in full line in Figs. 4 and 5. However, when the collector accumulates a film of water thereon, the weight of the water overcomes the weight of the counter weight 41 and pivots the balance rod 38 on the axle 37 to the position shown in broken lines in Fig. 4 and in full lines in Fig. 6.

In order to reflect the position of the balance rod 38, a mercury switch 45 is mounted on the rod 38, for example by a yoke 46, preferably positioned on the rod 38 at its junction with the axle 37. In the present instance the yoke 46 centers the mercury switch 45 under the axle 37 so that the mercury in that switch cooperates with the collector 39 and counter weight 41 to overbalance the balance arm 38 in its proper position. In other words when the collector 39 collects sufficient water to counteract the weight of the counter weight 41, and the rod 38 pivots on the axle 37 to the position shown in Fig. 6, the mercury 47 in the mercury switch travels to the right as shown in Fig. 6, at which location it serves to assist in retaining the balance rod 38 in the position shown in Fig. 6. When the water on the collector 39 evaporates, then the counter weight 41 causes the balance rod 38 to pivot on the axle 37 to the position shown in Fig. 5 and the mercury 47 travels to the position of Fig. 5 where it assists in retaining the balance rod 38 with its left hand side lowermost. Thus the mercury switch not only serves its function as a switch, but also serves the function of an over-center device.

The mercury switch 45 is connected to the terminal block 31 by a pair of leads 48 and 49 which are arranged as shown in Fig. 4 to minimize the effect of the leads upon the balance of the rod 38. The leads 48 and 49 are relatively flexible and are crossed immediately adjacent the mercury switch 45 underlying the pivotal axle 37 so that they do not have any substantial effect upon the balance of the rod 38.

It is noted that the present invention enables the connection of the solenoid of the valve 16 directly to a standard outlet box 51 by simply plugging in the plug 33 without the necessity for relays or other expensive voltage reduction devices, the mercury switch 45 being able to accommodate the normal line voltage used to operate the solenoid valve 16. It is noted that when the arm is in the position of Fig. 5, the mercury switch 45 is closed which completes a circuit to the solenoid valve 16 to open the valve and initiate spraying through the umbrella nozzles 11. When a film of water is collected on the collector 39, the switch is displaced to the position shown in Fig. 6 where the circuit is opened, thereby closing the solenoid valve and interrupting the supply of water to the nozzle 11.

The frequency of displacement of the balance rod 38 is dependent to a great extent upon the position of the sensing device 21 relative to the nozzles 11. If the device 21, as shown in full lines in Fig. 3, is positioned adjacent the nozzle 11, it is highly sensitive to the moisture, and cycles are of short duration. However, if the unit 21 is displaced further from the nozzles 11, such as shown in broken lines at 21a of Fig. 3, the periods are longer and the system cycles less frequently. Depending primarily upon the atmospheric condition, the cycle may repeat every minute or may not repeat except for every hour.

In accordance with the invention, the particular construction of the unit 21 contributes substantially to the effectiveness of the present invention. As shown in Fig. 9, the balance rod 38 is centered between the side walls 23 and 24 by means of plastic sleeves 60 and 61 freely slidable on the axle 37 intermediate the balance rod 31 and the respective bushings 58 and 59. The bushings 58 and 59 are Monel bushings, and provide an elongated shield protecting a small bearing surface at the inner end of the bushing which is relatively frictionless. The free movement of the sleeves 60 and 61 on the axle 37 substantially eliminates the effect of any friction which might be present between the bushings and the sleeves, and thereby makes the pivotal mounting of the rod 38 substantially frictionless. In order to further assist in the centering of the rod 38, the peaked roof 25 of the casing 22 cooperates with the balance rod 38, when in the full line position of Figs. 4 and 9 and with the counter weight 41 when the rod is in the broken line position of Figs. 4 and 9. The peak on the roof 25 tends to center the rod 38 in alignment therewith so that if the rod 38 tends to become displaced laterally from the center of the unit 21, the engagement of the rod 38 and the balance 41 with the peak of the roof will tend to center the rod 38 under the peak of the roof.

The roof 25 serves as a limit stop for the clockwise and counterclockwise positions of the balance rod 38. The clockwise limit position of the balance rod 38 is determined by the engagement of the counterbalance 41 with the roof 25 so that the rod assumes the clockwise limit position shown at 38a in Fig. 4 wherein the top of the collector 39 is substantially horizontal. The horizontal disposition of the top insures a uniform film of water over the entire collector when it is in its clockwise limit position and by providing a uniform film of water, the evaporation over the entire surface is uniform and the unit exhibits the proper sensitivity. When the balance rod 38 is in its counterclockwise limit position, it is substantially dry, but any droplets of water that might remain on the collector would be displaced toward the pivot and thereby reduce their moment on the balance rod as the balance rod shifts towards its counterclockwise limit position, as determined by the engagement of the rod 38 in the peak of the roof 25.

It should be noted that the present invention provides a self-contained unit which is adapted to be connected to the standard solenoid valve and to be plugged into a standard outlet 51. The enclosure formed by the casing 22 protects the operating parts of the unit against damage by water. To further insure against damage, it is preferred to fabricate all of the exposed parts of the unit out of stainless steel or similar non-corrosive material. The enclosure also prevents water droplets from accumulating on the operating parts, which would adversely affect the precise balance and accurate control provided by the present invention. The roof 25 not only protects the mercury switch 45, the axle 37, counterweight 41 from the effect of moisture, but also protects the same against damage should foreign particles be dropped thereon, for example, during the cultivating of the seed bed 13.

While a particular embodiment of the present invention has been herein illustrated and described, it is not intended to limit the invention to such a disclosure. Changes and modifications may be made therein and thereto within the scope of the following claims.

I claim:

1. In an automatic misting system for cutting beds or the like having at least one misting nozzle operable upon a supply of liquid thereto to direct a mist of spray over said bed, and a valve to control the supply of spray liquid to said nozzle; an automatic control means to operate said valve comprising a housing having a pair of spaced-apart side walls and a peaked roof, a non-absorbent collector mounted in the atmosphere above the bed and in the path of the mist from the spray nozzle to collect thereon a film of water of a thickness determined by the surface tension thereof, a balance rod mounting said collector at one end and pivoted in said housing to underlie the peak of the roof, a counter weight mounted on the opposite end of said balance rod to overcome the weight of said collector when it is dry, but of insufficient weight to overcome the weight of said collector when it is provided with a film of liquid thereon, said counter weight being positioned within said casing and operable upon over-balance thereof by said collector with its film of water to cause the rod to assume a first limit position wherein the counter weight is engaged against said roof at its peak to center the balance rod thereunder and to limit the pivotal movement thereof, said balance rod when said counterbalance overcomes the weight of said dry collector assuming a second limit position engaged in the peak of said roof to assist in centering the balance rod thereunder, and a switch means responsive to the position of said rod and connected to said valve to supply water to said nozzle in the second position of said rod and to interrupt said supply in the first position of said rod.

2. A system according to claim 1 wherein said valve comprises a solenoid valve and said switch means comprises a mercury switch mounted on said balance rod and centered over its pivotal support in said casing so that upon displacement of said balance rod from one of said limit position to the other, said mercury flows over the pivotal center of said rod to assist said pivotal movement.

3. A system according to claim 1 wherein said valve comprises a solenoid valve and said switch means comprises a mercury switch connected in series with said solenoid valve, and a plug for connecting said switch and solenoid valve to a standard outlet.

4. A system according to claim 1 wherein said non-absorbent collector comprises a fine mesh screen mounted on said balance rod with flat faces thereof declining outwardly from said rod to form a liquid-shedding surface capable of retaining only a thin film of liquid thereon by action of its surface tension.

5. A system according to claim 1 wherein said counter weight is threaded on said rod for longitudinal adjustment thereon, and including a lock nut and friction spring locking said counter weight in its adjusted position.

References Cited in the file of this patent

UNITED STATES PATENTS 2,577,337    Lancaster _____ Dec. 4, 1951